Patented Mar. 10, 1936

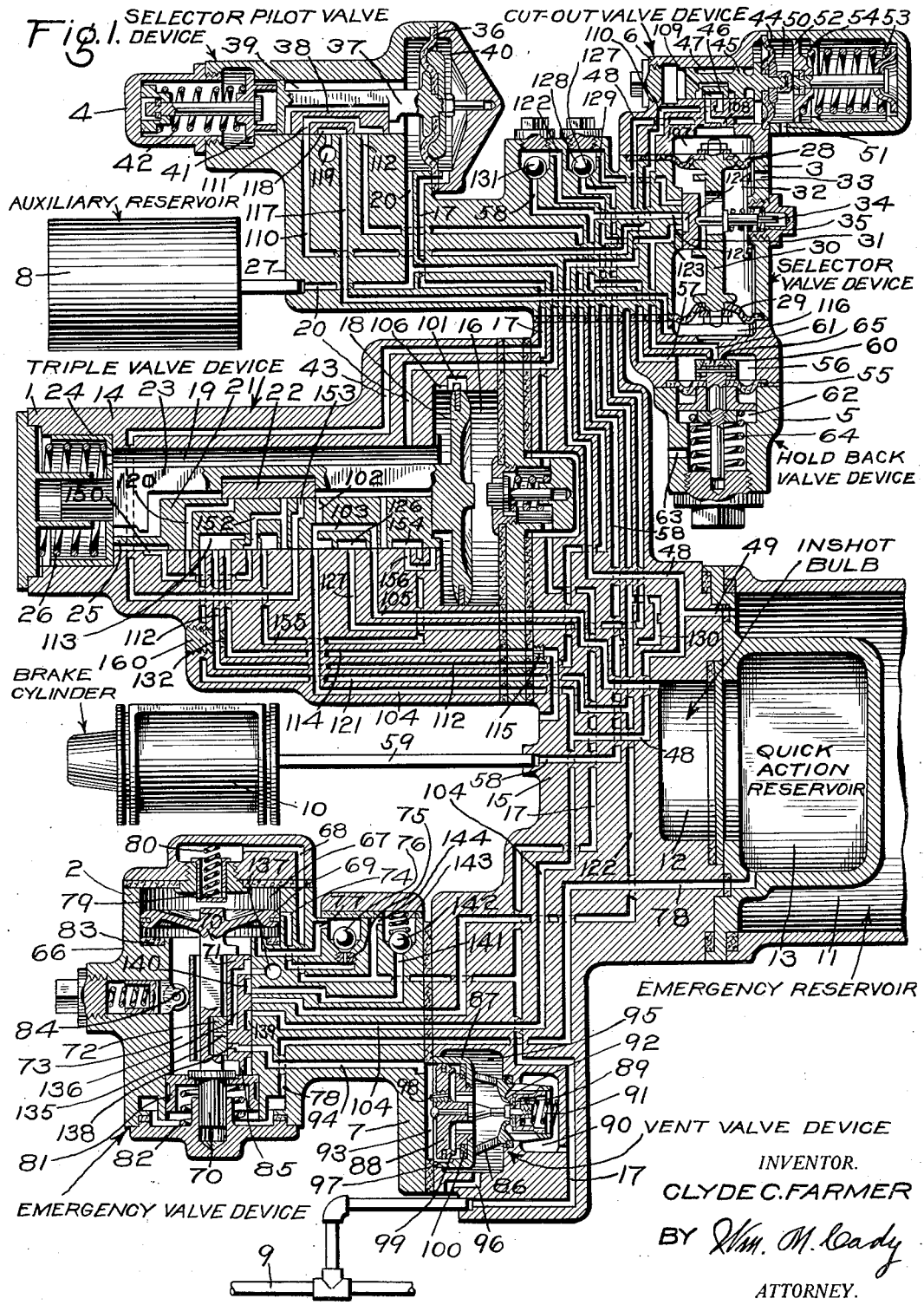

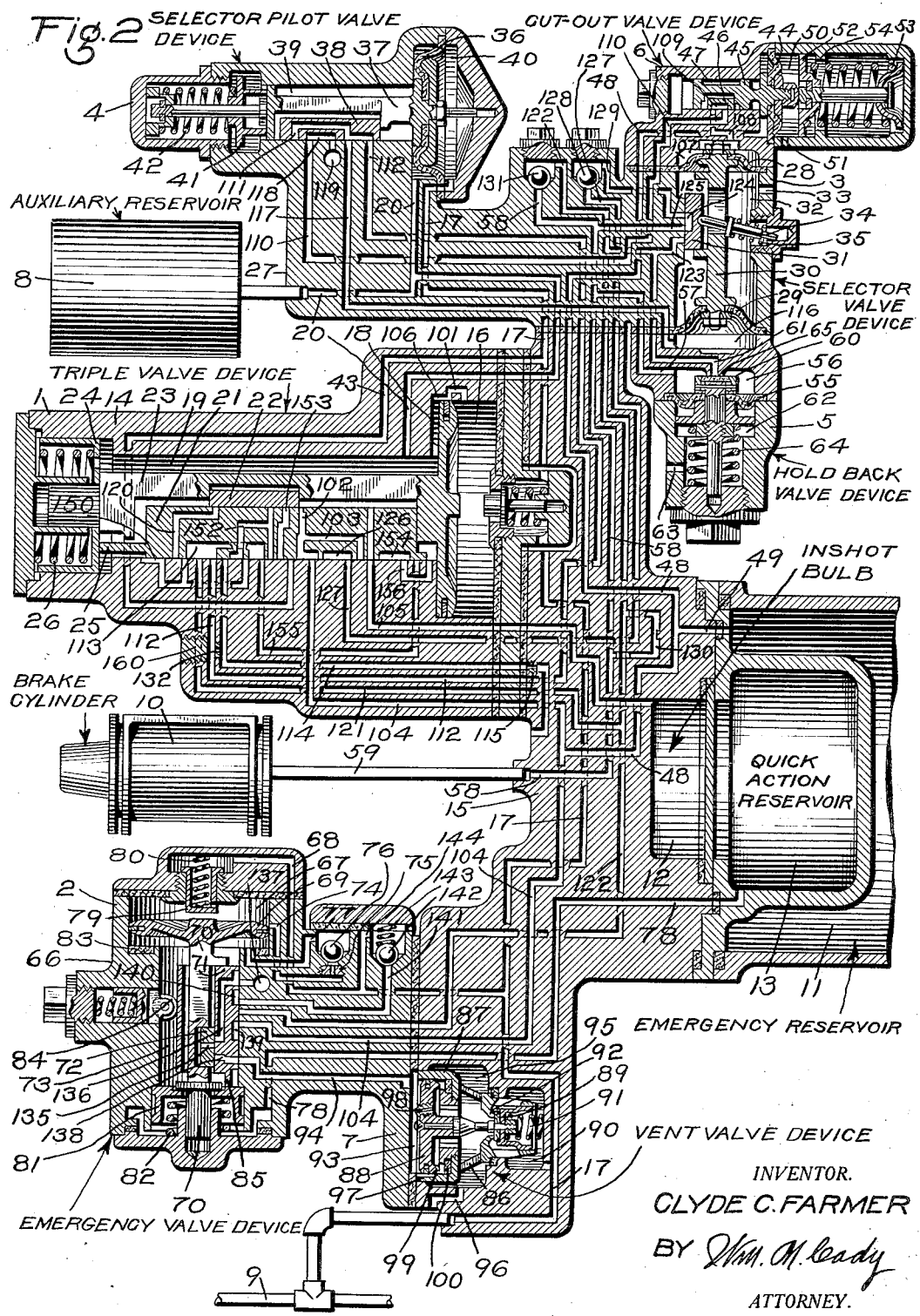

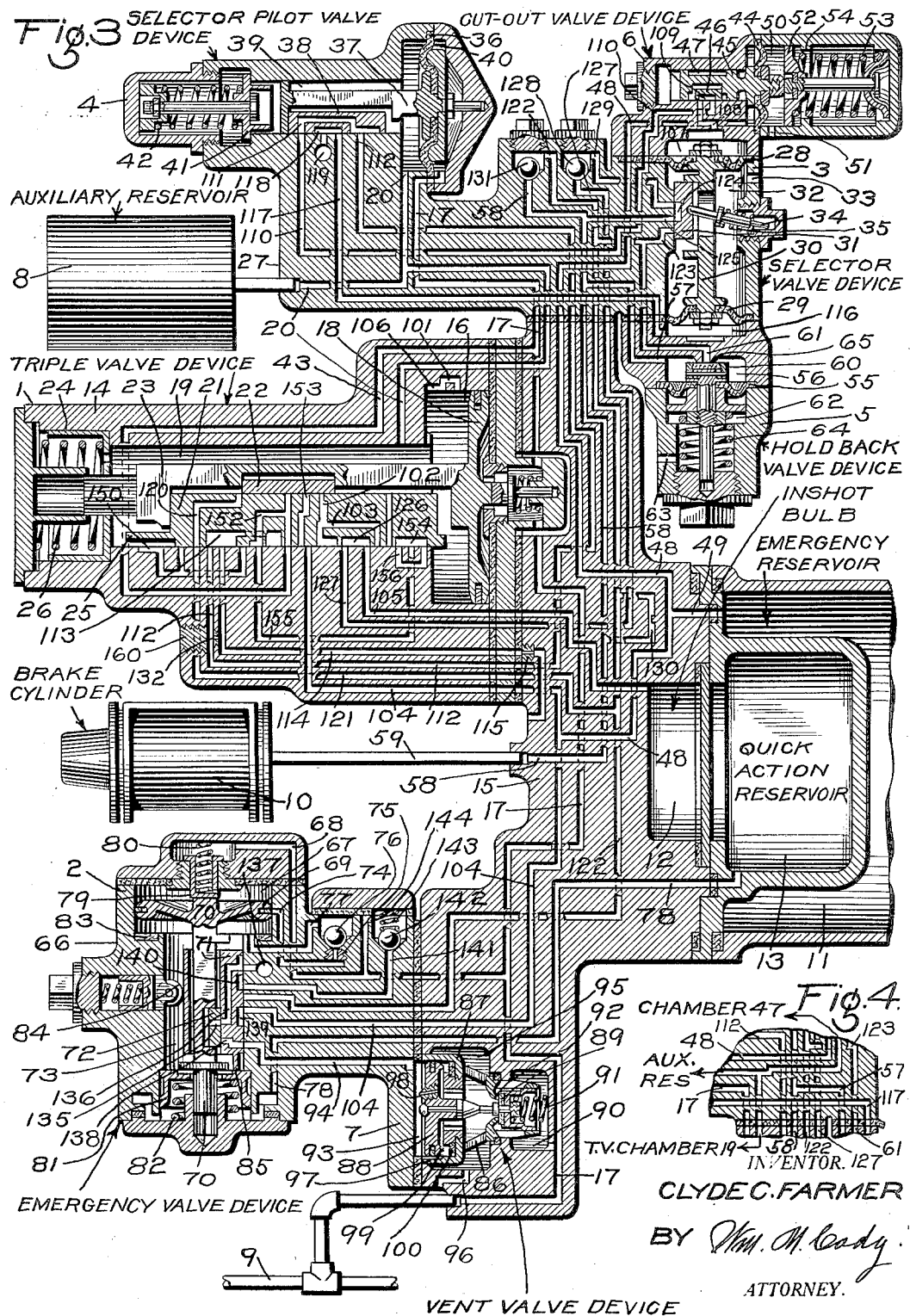

2,033,461

UNITED STATES PATENT OFFICE 2,033,461

FLUID PRESSURE BRAKE

Clyde C. Farmer, Pittsburgh, Pa., assignor to The Westinghouse Air Brake Company, Wilmerding, Pa., a corporation of Pennsylvania Application March 28, 1931, Serial No. 526,015

16 Claims. (Cl. 303—37)

This invention relates to fluid pressure brakes, and more particularly to an automatic fluid pressure brake system in which the brakes are applied upon effecting a reduction in brake pipe pressure and are released upon effecting an increase in brake pipe pressure.

There is a continuing tendency to increase the number of freight cars in a train and where heretofore a freight train might consist of 100 cars, there are now being operated trains up to 150 cars or more in length.

With the increase in the length of the train, and consequent increase in the length of the brake pipe, the operating difficulties in the control of the brakes are correspondingly increased.

One such difficulty arises from the increased length of time required to obtain approximately the full working pressure in the fluid pressure brake system on the rear cars of a very long train to insure the prompt and proper release of the brakes on the train.

Another difficulty arises in controlling the brakes in effecting an application so that the slack between cars will not run in and cause damaging shocks.

The principal object of my invention is to provide an improved fluid pressure brake equipment which will operate to promptly and properly control the brakes and which will eliminate the above mentioned operating difficulties.

On long trains, there is danger that excessive and damaging shocks may be caused when the brakes are applied, due to the fact that the brakes are applied on the cars at the front end of the train before they are applied on the cars at the rear end of the train, so that the slack is permitted to run in harshly and thus cause shocks.

Another object of my invention is to provide improved means for delaying the brake application on cars at the front end of the train, so that the brakes will be applied on the cars at the front end of the train more nearly in synchronism with the application of the brakes on the cars at the rear end of the train.

Another object of my invention is to provide improved means for preventing the retardation of the brake application on the front end of the train when the train is operated in high speed service or grade service with the equipment charged with fluid at a pressure higher than that normally carried for low speed service.

Another object is to provide improved means for preventing the retardation of the brake application on the front end of the train when the equipment is charged with fluid at the normal pressure and the train is operating on a descending grade after the brake cylinder pressure retainers become effective to retain a predetermined pressure in the brake cylinders.

Another object is to provide improved means operative on the cars at the front end of the train, when an application of the brakes is initiated, to first cause a quick inshot of fluid to the brake cylinder to cause the brake cylinder pistons on these cars to move out and close the usual leakage grooves, then retard the rate of flow of fluid to the brake cylinder and finally when the brake cylinder pressure has been built up to a predetermined degree, provide for the rapid build up in brake cylinder pressure.

Another object is to provide means operative to supply fluid under pressure from the auxiliary reservoir and brake cylinder to the brake pipe in effecting the release of the brakes after an emergency application of the brakes.

A further object is to provide means for maintaining the auxiliary reservoir pressure of the equipment higher than the brake pipe pressure when the auxiliary reservoir and brake cylinder are connected to the brake pipe in releasing the brakes after an emergency application, so as to render the triple valve device inoperative by pressure surges which may be created in the brake pipe.

Other objects and advantages will appear in the following more detailed description of the invention.

In the accompanying drawings; Fig. 1 is a diagrammatic view, mainly in section, of a fluid pressure brake equipment embodying my invention, the several parts of the equipment being shown in normal release position and as assumed at the rear end of the train in releasing after an application; Fig. 2 is a similar view of the equipment shown in Fig. 1, but showing the parts in retarded release position at the head end of the train; Fig. 3 is a similar view, but showing the parts in application position at the head end of the train; and Fig. 4 is a fragmentary sectional view of a modification in which the cut-out valve device is controlled by fluid under pressure from the auxiliary reservoir.

The equipment may comprise a triple valve device 1, an emergency valve device 2, a selector valve device 3, a selector pilot valve device 4, a hold back valve device 5, a cut-out valve device 6, a vent valve device 7, an auxiliary reservoir 8, a brake pipe 9, a brake cylinder 10, an emergency reservoir 11, an inshot bulb 12 and a quick action reservoir 13.

The triple valve device 1 comprises a casing 14 which is secured to a pipe bracket 15 and which has a piston chamber 16 connected through a passage 17 with the brake pipe 9 and containing a piston 18. At the opposite side of piston 18 is a valve chamber 19 connected through a passage 20 with the auxiliary reservoir 8 and containing a main slide valve 21 and a graduating slide valve 22 adapted to be operated by the piston 18, through the medium of a piston stem 23.

The triple valve device is of the retarded release type, and consequently is provided with a retarded release stop 24 which is adapted to engage the rear end of the piston stem 23 and also engage a lug 25 projecting rearwardly from the main slide valve 21. Movement of the stop 24 by the piston stem 23 is opposed by the action of a coil spring 26.

The selector valve device 3, selector pilot valve device 4, hold back valve device 5 and cut-out valve device 6 are contained in a casing 27 secured to the pipe bracket 15.

The selector valve device 3 may comprise flexible diaphragms 28 and 29 which are mounted in the casing 27 and which are connected together by a stem 30, said stem being adapted to operate a slide valve 31 contained in a valve chamber 32 intermediate said diaphragms. The valve chamber 32 is open to the atmosphere through a port 33. A rocking pin 34 engages the slide valve 31 and is subject to the pressure of a coil spring 35, so as to yieldably press said valve to its seat.

The selector pilot valve device 4 comprises a flexible diaphragm 36 having a stem 37 for operating a slide valve 38 contained in a valve chamber 39 at one side of the flexible diaphragm, which chamber is connected to the auxiliary reservoir 8 through the passage 20. At the other side of the diaphragm is a chamber 40 which is connected to the brake pipe 9 through the passage 17. A stop member 41, subject to the pressure of a coil spring 42, yieldably resists rearward movement of the stem 37 from the position in which it is shown in Fig. 1.

The passage 17 leading from the brake pipe 9 is also connected to the seat of the main slide valve 21 of the triple valve device 1 through a passage 43.

The cut-out valve device 6 may comprise a flexible diaphragm 44 which is mounted in the casing 27 and which has a stem 45 for operating a slide valve 46 contained in a chamber 47 which is connected to the emergency reservoir 11 through passages 48 and 49. Contained in a chamber 50 which is open to the atmosphere through a port 51, is a stop member 52 which is subject to the pressure of a coil spring 53 and which yieldably resists forward movement of the stem 45. Forward movement of the stem 45 is limited by the stop member 52 engaging an annular stop 54 carried by the casing.

The hold back valve device 5 comprises a flexible diaphragm 55, at one side of which, is a chamber 56 which is open to the brake cylinder 10 through passages 57 and 58 and a pipe 59. Carried by the diaphragm and contained in the chamber 56 is a valve 60 which is operative by the diaphragm to control communication from a passage 61 to the diaphragm chamber 56. At the other side of the diaphragm 55 is a chamber 62 which is open to the atmosphere through a port 63 and contained in this chamber is a coil spring 64, the pressure of which urges the valve 60 toward its seat rib 65.

The emergency valve device 2 comprises a casing 66 secured to the pipe bracket 15 and having a piston chamber 67 connected to the brake pipe 9 through passages 68 and 17 and containing a piston 69 having a stem 70 which is adapted to operate a main slide valve 71 and an auxiliary slide valve 72 contained in a valve chamber 73. The piston chamber 67 is connected to the valve chamber 73 through a passage 74, a choke plug 75, past a ball check valve 76 and through a passage 77. The valve chamber 73 is also connected to the quick action reservoir 13 through a passage 78. A stop member 79, subject to the pressure of a coil spring 80, opposes outward movement of the piston 69, beyond service position, and a stop member 81, subject to the pressure of a coil spring 82, opposes inward movement of the piston 69 beyond release position. The slide valve 71 is provided with a rearwardly extending extension 85 which is adapted to be engaged by the stop member 81. Mounted in the casing 66 is an annular gasket 83 against which the rear face of the emergency piston 69 is adapted to seat and form an air-tight seal. A spring-pressed roller 84 engages the back of the main slide valve 71 and yieldably presses said slide valve to its seat.

The vent valve device 7 comprises a cage member 86 which is mounted in the pipe bracket 17, said cage member having a cylinder portion 87 in which is mounted a quick action piston 88 adapted to operate a vent valve 89 contained in a chamber 90 open to the brake pipe passage 17. The pressure of a spring 91 contained in the chamber normally maintains the valve 89 seated on a seat rib 92 integral with the cage member 86 and also yieldably resists inward movement of the quick action piston.

At one side of the piston 88 there is a chamber 93 which is connected by a passage 94 to the seat of the slide valve 71 and at the other side of the piston is a chamber 95 which is open to the atmosphere through a passage 96. The chambers 93 and 95 are connected together through a leakage groove 97 around the piston and a port 98 of small diameter in the piston.

An annular rib 99 projects from the inner face of the piston 88 and is adapted to seat on a gasket 100 mounted in the cylinder portion 87 of the cage member 86 to prevent leakage around the piston 88 from the chamber 93 to the chamber 95.

In operation, when the brake pipe is being initially charged with fluid under pressure, the triple valve piston 18 and associated slide valves 21 and 22 may be in full release position, as shown in Fig. 1, or may be in retarded release position, as shown in Fig. 2.

With the triple valve piston 18 in full release position, fluid under pressure supplied to the triple valve piston chamber 16 through the brake pipe passage 17, flows through a passage 101 around the piston to the valve chamber 19 and from thence fluid under pressure flows to the auxiliary reservoir 8 and to the valve chamber 39 of the selector valve device 4 by way of passage 20. Fluid under pressure also flows from the valve chamber 19 to the emergency reservoir 11 through a restricted port 102 and a communicating cavity 103 in the main slide valve 21, a passage 104 and passages 48 and 49. From the cavity 103 in the main slide valve, fluid under pressure flows through a passage 105 to the inshot bulb 12.

Fluid under pressure also flows through the passage 104 to the seat of the emergency slide valve 71 and to the valve chamber 47 in the cut-out valve device 6 by way of passage 48.

From the passage 17 fluid under pressure flows to the vent valve chamber 90 and to the diaphragm chamber 40 in the selector pilot valve device. Fluid under pressure also flows from the passage 17 to the emergency piston chamber 67 through passage 68 and from the chamber 67 flows to the emergency valve chamber 73 through passage 74, choke plug 75, past the ball check valve 76 and through passage 77. Fluid under pressure thus supplied to the valve chamber 73 flows to the quick action reservoir 13 through passage 78.

If the triple valve piston 18 should be in retarded release position, as shown in Fig. 2, the valve chamber 19 and auxiliary reservoir are charged with fluid under pressure through the feed passage 101 and a feed groove 106, which feed groove has a more restricted flow area than the feed passage 101. When the auxiliary reservoir pressure present in the valve chamber 19 becomes substantially equal to the brake pipe pressure present in the piston chamber 16, the spring 26, acting through the medium of the stop member 24 shifts the triple valve parts to full release position as shown in Fig. 1.

According to one feature of my invention, means are provided whereby the rate of build up of pressure in the brake cylinder on cars at the front end of the train is slowed down, so that the brakes on the cars at the rear end of the train will be applied more nearly in synchronism with the brakes on cars at the front end of the train and for this purpose, the selector valve device 3 is provided having one position in which the rate of flow of fluid under pressure to the brake cylinder, in effecting either a service or an emergency application of the brakes, is restricted, and another position in which the usual full rate of flow is permitted.

The operation of the selector valve device is controlled by the selector pilot valve device 4, and triple valve device 1, the pilot valve device being operated according to the rate of increase in brake pipe pressure.

In starting out from a station or terminal, a service application of the brakes is usually made to test the brakes of the train and when the brake pipe pressure is reduced to effect a service application of the brakes, the fluid pressure in the diaphragm chamber 40 of the pilot valve device 4 is also reduced, so that on every car of the train, the diaphragm 36 is flexed in the direction toward the right hand by the higher pressure in the valve chamber 39 to the position shown in Fig. 3. When the diaphragm 36 is thus flexed, the slide valve 38 on each car will be in its extreme right hand position, as shown in Fig. 3, in which position a chamber 107 at the upper side of the diaphragm 28 of the selector valve device 3 is open to the atmosphere through a passage 108, a cavity 109 in the slide valve 46 of the cut-out valve device 6, a passage 110, a cavity 111 in the slide valve 38 of the pilot valve device 4, a passage 112, a cavity 113 in the main slide valve 21 of the triple valve device 1 and a passage 114 having a choke plug 115 interposed therein. Further, with the slide valve 38 in this position, a chamber 116 at the lower side of the diaphragm 29 of the selector valve device is open to the atmosphere through a passage 117, a cavity 118 in the slide valve 38 and a passage 119.

With the diaphragm chambers 107 and 116 of the selector valve device thus open to the atmosphere, the diaphragms 28 and 29 will not be flexed in either direction, so that the diaphragm stem 30 will remain in the position in which it is shown in Fig. 1 until such time as the release of the brakes is initiated. Since the stem 30 is not operated, the slide valve 31 will remain in whatever position it happens to be after initially charging the equipment.

When a brake pipe reduction is effected as above described, the triple valve piston 18 moves to application position, as shown in Fig. 3, the triple valve device being of the type in which the piston makes full traverse in effecting a service application of the brakes. If the slide valve 31 of the selector valve device 3 should happen to be in the position shown in Fig. 1, fluid under pressure is then supplied from the auxiliary reservoir 8 to the brake cylinder 10 through passage 20, triple valve slide valve chamber 19, a service port 120 in the main slide valve 21, which port has been uncovered by the graduating slide valve 22, connected passages 121, 122 and 123, a cavity 124, a passage 125, passage 58 and pipe 59. If, on the other hand, the slide valve 31 is in the position shown in Fig. 3, fluid under pressure from the inshot bulb 12 is supplied to the brake cylinder by way of passage 105, a cavity 126 in the main slide valve 21, a passage 127, past a ball check valve 128, a passage 129, cavity 124 in the selector slide valve 31, passages 125 and 58 and pipe 59. From the passage 58 fluid under pressure is also supplied to the brake cylinder through a restricted passage 130, passage 58 and pipe 59.

When the brake pipe pressure is reduced at a service rate, the emergency piston 69 moves out, shifting the slide valve 72 relative to the slide valve 71 to a position in which a port 135 in the slide valve 72 registers with a port 136 in the slide valve 71, said port 136 being in registration with an atmospheric exhaust passage 137. With the slide valve in this position, the piston 69 is in engagement with the stop 79. Fluid under pressure is then vented from the valve chamber 73 and consequently from the quick action reservoir 13 to the atmosphere by way of exhaust passage 137, to prevent further movement of the emergency piston toward emergency position. Now when the pressure of fluid in chamber 73 is slightly less than brake pipe pressure present in chamber 67, the piston 69 and consequently the slide valve will be returned to normal position as shown in Fig. 1, thus closing off the further flow of fluid from the chamber 73 and quick action reservoir 13 to the atmosphere.

To release the brakes, fluid under pressure is supplied to the brake pipe. In supplying fluid under pressure to the brake pipe it is the usual practice to move the brake valve (not shown) to release position to supply fluid to the brake pipe at a rapid rate and at a pressure higher than that normally carried in the brake pipe, so as to obtain a pressure build up at the rear of the train as quickly as possible. Fluid at this high pressure is permitted to flow to the brake pipe for a predetermined time and then the brake valve is moved to the usual running position, in which the pressure of fluid supplied to the brake pipe is governed by the usual feed valve device (not shown). Upon thus cutting off the high pressure supply of fluid to the brake pipe, the pressure of fluid at the front end of the train reduces, by the flow of fluid toward the rear end of the train, to the pressure of fluid supplied by the feed valve device.

It will thus be seen that in charging the brake pipe, as described, a high brake pipe pressure is obtained only in the front portion of the train and gradually reduces toward the rear end of the train. As a result, the diaphragms 36 of the selector pilot valve devices 4 on the cars at the front end of the train are flexed inwardly to their extreme left hand positions against the opposing pressure of the spring-pressed stop members 41 acting through the stems 37 which are secured to the diaphragms. As the diaphragms are being thus flexed, the stems 37 engage and shift the slide valves 38 to their extreme left hand positions, in which the diaphragm chambers 107 in the selector valve devices 3 are connected to the atmosphere through passages 108, cavities 109 in the cut-off slide valves 46, passages 110, cavities 118 in the slide valves 38 of the pilot valve devices and passages 119, and in which positions the diaphragm chambers 116 are connected to the seats of the triple valve slide valves through passages 112.

On the cars at the rear of the train, where the rise in brake pipe pressure is only sufficient to move the diaphragms 36 until the stems 37 engage the spring-pressed stop members 24, the slide valves 38, on account of the lost motion between them and their stems 37, will not be shifted toward the left hand, thus each of the slide valves will be set in the position shown in Fig. 3, in which position the diaphragm chambers 107 and 116 in the selector valve device 3 are open to the atmosphere, as before described.

Now when the brake pipe pressure in the triple valve piston chamber 16 exceeds auxiliary reservoir pressure in the valve chamber 19, the piston 18 moves inwardly to release position. On the cars at the front end of the train where the rise in brake pipe pressure is rapid, the triple valve piston will move to retarded release position, as shown in Fig. 2 and on the cars at the rear of the train, where the rise in brake pipe pressure is less rapid, the triple valve piston 18 will move to full release position, as shown in Fig. 1. As the triple valve pistons are thus moved, they shift the triple valve slide valves to corresponding positions. With the main slide valve 21 in retarded release position, fluid under pressure is vented from the brake cylinder to the atmosphere by way of pipe 59, passage 58, past a ball check valve 131, passages 122 and 121, cavity 113 in the main slide valve 21, passage 112, a choke plug 132 and passage 114. Fluid under pressure discharged from the brake cylinder also flows from the passage 112 to the diaphragm chamber 116 of the selector valve device 3 through the cavity 111 in the slide valve 38 of the pilot valve device and passage 117, causing the diaphragms 28 and 29 and stem 30 of the selector valve device to be shifted upwardly. If the selector slide valve 31 is not in the position, as shown in Fig. 2, it will be caused to move to this position by the stem 30. The diaphragms 28 and 29 and stem 30 return to normal position, as the pressure in diaphragm chamber 116 reduces to atmosphere with the brake cylinder by flow through the exhaust passage 114. When the auxiliary reservoir pressure is substantially equal to brake pipe pressure, the spring-pressed stop 24 returns the triple valve parts to full release position, as shown in Fig. 1.

With the main slide valve 21 in full release position, fluid under pressure released from the brake cylinder flows from the passage 112 to the diaphragm chamber 107 in the selector valve device by way of cavity 111 in the slide valve 38 of the pilot valve device, passage 110, cavity 109 in the slide valve 46 of the cut-out valve device 6 and passage 108, causing the diaphragms 28 and 29 and stem 30 to be shifted downwardly. If the selector slide valve 31 is not in the position as shown in Fig. 1, the stem 30 will shift it to this position. The diaphragms 28 and 29 and stem 30 return to normal position, as the pressure of fluid in chamber 107 reduces to the atmosphere with the brake cylinder.

Due to the lost motion between the stem 30 and slide valve 31, no movement will be imparted to the slide valve 31 when the diaphragms 28 and 29 and the stem 30 return to normal position and said valve will be maintained in adjusted position by the pressure of the spring-pressed rocking pin 34.

When the brake pipe pressure and auxiliary reservoir pressure are nearly equal, the pressure of the spring 42 transmitted through the stop member 41 will return each stem 37 and diaphragm 36, which has been shifted to the extreme left hand position, to normal position, as shown in Fig. 1. Due to the lost motion between the stem 37 and the slide valve 38, the movement of the stem to normal position will not change the position of the slide valve.

The flexible diaphragm 36 of the selector pilot valve device is made more sensitive to movement than the triple valve parts, so that in effecting an application of the brakes, the diaphragm 36 on each car of the train will flex to its extreme right hand position before the triple valve parts move to application position, thus insuring the proper positioning of the slide valve 38 on each of the rear cars of the train.

It will be seen from the above description that when the train starts out from a station or terminal after the brakes have been applied and then released, the slide valves 38 and 31 of the selector pilot valve device and selector valve device, respectively, on cars at the front end of the train, will be positioned as shown in Fig. 2, while on cars at the rear end of the train the slide valves 38 and 31 will be positioned as shown in Fig. 1.

With the parts of the equipment adjusted as above described, when a reduction in brake pipe pressure is effected, the pilot valve diaphragm 36 on each car of the train flexes to its extreme right hand position, shifting the slide valve 38 on each of the cars at the front end of the train from its extreme left hand position to its extreme right hand position, as before described. On each of the cars at the rear end of the train where the slide valve 38 is in its extreme right hand position, the flexing of the diaphragm will not impart movement to the slide valve. After the diaphragms have been thus flexed, the piston 18, due to the reduction in brake pipe pressure, moves to service position. As the piston thus moves, it shifts the graduating slide valve 22 relative to the main slide valve 21 and uncovers the service port 120 in the main slide valve 21 and then shifts the main slide valve to service position in which the service port 120 registers with the passage 121, so that fluid under pressure from the auxiliary reservoir is supplied to the passage 48.

With the main slide valve 21 in service position, the cavity 126 therein connects the passages 105 and 127 together, so that fluid under pressure is supplied to the seat of the selector slide valve 31.

On cars at the front end of the train, the selector slide valve 31 will be in its upper position, as shown in Fig. 3, in which position, the cavity 124 in the slide valve connects passages 129 and 125. Fluid under pressure is thus initially supplied from the normally charged inshot bulb 12 to the brake cylinder 10, and at a rate and in sufficient volume to insure that the brake cylinder piston will be moved out beyond the usual leakage grooves around the brake cylinder piston. The slide valve 31 in this position laps the passage 123 which is supplied with fluid under pressure from the passage 121 and connected passage 122, so that the additional supply of fluid under pressure required to move the brake cylinder piston far enough to cause the brake shoes to engage the car wheels must be through the restricted passage 130 which connects the passage 122 with the brake cylinder passage 58.

On cars at the rear end of the train, the selector slide valve 31 will be in its lower position, as shown in Fig. 1, in which position, the cavity 124 in the slide valve connects the passage 123, which is supplied with fluid under pressure from the auxiliary reservoir to the passage 125 which leads to the brake cylinder passage 58. The restricted passage 130 is thus by-passed, and fluid under pressure is supplied to the brake cylinder at unrestricted rate.

It will thus be seen that the retardation of the cars at the head end of the train by applying the brakes is delayed, so that a time period is provided to permit the brakes to be applied on cars at the rear end of the train, and consequently, excessive shocks, due to the running in of the slack are avoided.

The hold back valve device 5 is for the purpose of providing a more rapid build up in brake cylinder pressure on the cars at the front end of the train after the brakes have been applied on the cars at the rear end of the train. When the brake cylinder pressure present in the diaphragm chamber 56 of this valve device exceeds the opposing pressure of the spring 64, the diaphragm 55 is flexed downwardly, unseating the valve 60 from its seat rib 65. With the valve 60 thus unseated, fluid under pressure from the auxiliary reservoir flows from the passage 122 to the brake cylinder 10 through passages 123 and 61, diaphragm chamber 56, passages 57 and 58 and pipe 59. Thus an increased rate of flow of fluid under pressure to the brake cylinder is provided after the brake cylinder has been built up to a predetermined degree.

The ball check valve 128 prevents back flow of fluid under pressure from the brake cylinder 10 to the inshot bulb 12 when the selector slide valve 31 is in its upper position and the bulb has equalized into the brake cylinder.

In high speed service it is not essential to retard the application of the brakes on cars at the front end of the train and it is for the purpose of cutting out the slow build up of brake cylinder pressure at the front end of the train that the cut-out device 6 is provided.

In low speed service, a lower pressure is usually carried than in high speed service, such as seventy pounds in low speed service and ninety pounds in high speed service. The spring 52 of the cut-out valve device is such that a pressure of seventy pounds in chamber 47 will not deflect the diaphragm 44 toward the right hand from the position in which it is shown in the drawings, but a pressure of approximately eighty pounds will do so.

As hereinbefore described, the emergency reservoir is charged from the valve chamber 19 of the triple valve device 1 which in turn is charged with fluid under pressure from the brake pipe, so that the pressure of fluid in the emergency reservoir 11 and consequently in the chamber 47 corresponds with the standard pressure carried in the brake pipe.

When the brake pipe pressure, in being raised to ninety pounds for high speed service, is increased to eighty pounds or thereabouts, the corresponding pressure in the chamber 47 of the cut-out valve device, deflects the diaphragm 44 toward the right hand against the opposing pressure of the spring 53 acting through the member 52. The diaphragm 44 as it is thus deflected shifts the stem 45 and slide valve 46 toward the right hand until such time as the member 52 stops against the annular lug 54 and brings the stem and slide valve to a stop. Just prior to the slide valve 46 being brought to a stop, it uncovers the passage 108 and fluid under pressure thus flows through this passage from the chamber 47 to the chamber 107, causing the diaphragms 28 and 29 of the selector valve device to be flexed downwardly, the diaphragms shifting the slide valve 31 to its lowermost or unrestricted brake cylinder build up position, in which the slow build up in brake cylinder pressure is prevented on cars at the front end of the train. Consequently, the brakes are applied at the same rate of build up on all the cars of the train.

In grade service where it is not desired to retard the rate of brake cylinder build up on the cars at the head end of the train, the brake pipe pressure is increased, preparatory to descending a grade, to substantially ninety pounds, so that the cut-out valve device 6 is caused to operate to render the selector valve device ineffective to retard the rate of brake cylinder pressure in the same manner as described in connection with high speed service.

In Fig. 4 a modification is illustrated in which the cut-out valve device is controlled by auxiliary reservoir pressure instead of by emergency reservoir pressure, as shown in Figs. 1 to 3 inclusive.

It will here be noted that the emergency reservoir 11 and auxiliary reservoir 8 are charged with fluid under pressure from the valve chamber 19 of the triple valve device 1 and that on the cars at the front end of the train the flow of fluid from the brake pipe to the chamber 19 is by way of the small feed groove 106. As a consequence, the reservoirs at the front end of the train will not be overcharged sufficiently to cause the cut-out valve device 6 to operate to render the selector valve device 3 ineffective to retard the brake application at the front end of the train. In this connection it will be seen that if the reservoir connected to the chamber 47 were overcharged sufficiently that the pressure in chamber 47 would overcome the pressure of the spring 53, the diaphragm 44 would operate to shift the slide valve to its cut-out position in which fluid under pressure would be supplied from the chamber 47 to the chamber 107 of the selector valve device and cause the selector slide valve 31 to be shifted to its lowermost position, so that upon effecting an application of the brakes, the flow of fluid to the brake cylinder on the cars at the front end of the train would not be restricted to retard the brake application.

If, in grade service, the brake pipe pressure should not be increased above that normally carried, the several parts of the cut-off valve device 6 will, of course, remain in their normal position, as shown in Fig. 1, and due to this, the connection from the passage 110 to the chamber 107 of the selector valve device is maintained. Now, in cycling the brakes, each time a reduction in brake pipe pressure is effected the movable parts of each pilot valve device 4 will move to their extreme outer position before the triple valve parts move to application position, as before described, so that fluid under pressure retained in the brake cylinder by the usual retaining valve device (not shown), which is set in pressure retaining position preparatory to descending a grade, flows to the chamber 107 in the selector valve device by way of pipe 59, passage 58, past the ball check valve 131, passages 122 and 121, cavity 113 in the triple valve slide valve 21, passage 112, cavity 111 in the slide vlave 38 of the pilot valve device, passage 110, cavity 109 in the cut-out slide valve 46 and passage 108.

With the slide valve 38 in its extreme outer position, the chamber 116 of the selector valve devices connected to the atmosphere by way of passage 117, cavity 118 in the slide valve 38 and passage 119.

With the chamber 116 thus vented, fluid under pressure supplied to the chamber 107 causes the movable parts to move to their lowermost position, in which unrestricted flow of fluid to the brake cylinder is permitted. It will here be noted that regardless of the position to which the moving parts of the pilot valve device 4 are moved during the partial release of brakes, each of the slide valves will be returned to its extreme outer position upon effecting a reduction in brake pipe pressure, thus rendering the selector valve device ineffective to retard the rate of flow of fluid to the brake cylinder.

When the brake pipe pressure is reduced at an emergency rate, the triple valve device 1 and selector pilot valve device 4 on each car of the train operates in the same manner as hereinbefore described in connection with a service application of the brakes. Upon thus effecting a sudden reduction in brake pipe pressure the emergency piston 69 is quickly shifted to its outer or emergency position against the resistance of the spring-pressed stop 79, first moving the auxiliary slide valve 72 relative to the slide valve 71 to lap the port 136 in the slide valve 71 and to uncover a port 138 in the slide valve 71. The port 138 is in registration with the passage 94 leading to the vent valve device 7, so that fluid under pressure now flows from the valve chamber 73 and quick action reservoir 13 to the quick action piston chamber 93.

Fluid under pressure thus supplied to the quick action chamber 93 causes the quick action piston 88 to move to its innermost position, unseating the vent valve 89, thus locally venting fluid from the brake pipe at a rapid rate to propagate quick action serially throughout the length of the train. When the quick action piston 88 is thus moved, it first closes the leakage groove 97 and then seats on the gasket 100 and when so seated forms an air-tight seal which prevents leakage of fluid past the periphery of the piston from the chamber 93 to the atmosphere.

After the port 138 has been uncovered, the continued outward movement of the emergency piston causes the slide valve 71 to be shifted to its emergency position, in which a cavity in the slide valve connects passage 104 to the passage 122 and in which the passage 94 and chamber 73 are directly connected together.

With the passages 104 and 122 connected together as just described and the triple valve device 1 in application position, fluid under pressure is supplied to the brake cylinder from the emergency reservoir 11 and the auxiliary reservoir 8, thus providing high pressure in emergency. In effecting an emergency application of the brakes, it will be understood that the selector valve device will control the rate of brake cylinder pressure build up in the same manner as described in connection with a service application of the brakes.

Fluid under pressure from the quick action piston chamber 93 and consequently from the emergency valve chamber 73 and quick action reservoir 13 is exhausted to the atmosphere through the choke 93. When the chamber 98 is substantially completely vented, the pressure of the spring 91 causes the vent valve 89 to seat and close off communication from the brake pipe to the atmosphere. It is obvious that the rate of flow of fluid from the chamber 93 as well as the volume of the quick action reservoir determine the period of time that the vent valve remains in open position and that this period of time may be increased or decreased by changing the volume of the quick action reservoir or changing the size of the choke.

When the brake pipe pressure is reduced in effecting either a service or an emergency application of the brakes, the ball check valve 76 prevents back flow of fluid from the chamber 73, so that no reduction in the pressure in the quick action reservoir occurs while the emergency piston is in its normal position as shown in Fig. 1.

To release the brakes after an emergency application has been effected, the brake pipe pressure is increased in the usual manner Since the quick action reservoir 13 and valve chamber 73 of the emergency valve device have been completely vented to the atmosphere during the emergency application of the brakes, the brake pipe pressure, when it has been increased to some low degree, say for instance to seven pounds, causes the emergency piston and associated slide valves 71 and 72 to move to their innermost or over-travel position against the opposing pressure of the spring-pressed stop 81. With the slide valve 71 in over-travel position, the passage 104 leading to the seat of the valve is lapped, thus bottling up the fluid under pressure in the emergency reservoir. The pressure of fluid now retained in the emergency reservoir is equal to brake cylinder pressure, i. e., approximately sixty pounds.

Further, with the emergency slide valve in over-travel position, the brake cylinder passage 122 is connected to the brake pipe 9 by way of a cavity 140 in the slide valve 71, a passage 141, past a ball valve 142, which is subject to the pressure of a spring 143, a passage 144 and passages 68 and 17.

It will here be noted that the triple valve piston 18 and associated slide valves 21 and 22 are still in their application position, so that when the emergency slide valve 71 is in its over-travel position, fluid under pressure flows to the brake pipe from the auxiliary reservoir 8 and also from the brake cylinder 10, with the result that the brake pipe pressure is built up to approximately forty pounds. Due to the pressure of the spring 143 acting on the ball valve 142, the auxiliary reservoir pressure will be slightly higher than brake pipe pressure.

It has been discovered that when the emergency valve device operates to its over-travel position and supplies fluid under pressure from the auxiliary reservoir and brake cylinder to the brake pipe, pressure surges are created in the brake pipe, which surges, if the auxiliary reservoir pressure should be permitted to equalize into the brake pipe, might cause the triple valve piston and associated slide valves to be moved back and forth to release and application positions, with the consequent unnecessary loss of fluid pressure and wear of the triple valve parts.

For the purpose of preventing the possible undesired operation of the triple valve parts due to the pressure surges created in the brake pipe as just described, the spring 143, which opposes the unseating of the ball valve 142, is of such a value as to seat the ball valve 142 before the brake cylinder and auxiliary reservoir pressures have equalized into the brake pipe, thus maintaining the auxiliary reservoir sufficiently high so as to prevent the undesired operation of the triple valve piston by pressure surges in the brake pipe. In some cases the pressure surges in the brake pipe may not be of such magnitude that they are liable to cause the undesired operation of the triple valve parts and in such cases, the spring 143 may be omitted.

Now when the brake pipe pressure has been increased slightly above auxiliary reservoir pressure present in the valve chamber 19 in the triple valve device, the piston 18 and slide valves 21 and 22 will be shifted from application position to a release position.

On the cars of the front end of the train where the brake pipe pressure is the highest, the triple valve parts move to retarded release position, as shown in Fig. 2 and on the cars at the rear end of the train move to normal release position, as shown in Fig. 1. With the slide valves 21 and 22 in either one of these positions, fluid under pressure flows from the emergency reservoir 11 to the auxiliary reservoir 8 by way of passages 49, 48 and 104, cavity 103 in the main slide valve 21, port 102, valve chamber 19 and passage 20.

With the triple valve device in either retarded release position or normal release position, fluid under pressure remaining in the brake cylinder is discharged to the atmosphere in the same manner as before described in connection with the release of the brakes after a service application.

When the pressure of fluid in the emergency valve chamber 73 and quick action reservoir is substantially equal to brake pipe pressure present in emergency piston chamber 67, the spring-pressed stop 81, which is in engagement with the stem 70 and slide valve 71, shifts the emergency valve parts from their over-travel position to their normal position, as shown in Fig. 1.

The check valve 77 is for the purpose of preventing back flow of fluid under pressure from the emergency valve chamber 73 and quick action reservoir 13 to the emergency piston chamber 67 when the passage 74 is open to the emergency piston chamber 67 and the pressure of fluid in the chamber 67 is less than the pressure of fluid in the chamber 73. The choke 75 beneath the ball check valve 76 is for the purpose of restricting the flow of fluid to the emergency valve chamber 73 and quick action reservoir 13 so as to prevent the chamber and reservoir from becoming overcharged, especially on the cars at the front end of the train where, in charging the equipment, the brake pipe pressure is temporarily highest.

When the emergency slide valve 71 is in its over-travel position, a toe cavity of the port 136 in said valve is in registration with the atmospheric exhaust passage 137, so that if the valve should, for any reason, fail to be returned to its normal position upon the equalization of the pressures on opposite sides of the emergency piston 69, the emergency valve chamber 73 and quick action reservoir will be vented to the atmosphere when the port 135 in the auxiliary slide valve is brought into registration with the port 136 upon the outward movement of the piston 69 when the brake pipe pressure is reduced at a service rate. By thus venting the chamber 73, the outward movement of the emergency piston and associated parts will cease and thus prevent unintentional movement of the emergency valve parts to emergency position.

With the triple valve parts in full release position, fluid under pressure is supplied from the valve chamber 19 to the under side of the graduating slide valve 22 by way of a cavity 150 in the triple valve casing, a passage 151, and ports 120 and 152 in the main slide valve 21. Fluid under pressure is also supplied to the underside of the graduating slide valve 22 from the brake pipe passage 17 by way of passage 43 and a port 153 in the main slide valve 21. Fluid under pressure thus partially relieves the graduating slide valve of the pressure in chamber 19 tending to force the graduating valve against its seat on the back of the main slide valve 21, thus reducing the resistance offered by the slide valve to the piston as it is moved to its feed groove closing position in effecting an application of the brakes.

With the main slide valve 21 in full release position a cavity 154 in the under side of the main slide valve is connected to the atmosphere by way of a passage 155, cavity 113 in the slide valve and atmospheric exhaust passage 114, thus loading the slide valve 21 so that a definite reduction in brake pipe pressure must be effected before the slide valve can be shifted from full release position.

With the triple valve parts in retarded release position, fluid under pressure flows from the valve chamber 19 to the under side of the main slide valve 22 by way of cavity 150 and by way of a passage 156 and cavity 154, thus unloading the slide valve and rendering it easily movable by the spring-pressed stop from retarded release position to full release position.

With the triple valve parts in application position, as shown in Fig. 3, fluid under pressure supplied to the brake pipe passage 17 in releasing the brakes flows to the cavity 154 by way of passage 43, port 152 in the main slide valve 22 and passage 155, thus unloading the slide valve so as to render it easily movable toward release position, especially at the rear end of a train.

The choke plug 132 which connects the passages 112 and 114 is removably mounted in the casing of the application valve device 1 and is rendered readily accessible for removal and replacement and for cleaning from the exterior of the casing by the removal of a plug 160 which has screw-threaded connection with the casing.

The subject matter relating to the controlled build-up of brake cylinder pressure and the subject matter relating to the feature of venting fluid under pressure from the auxiliary reservoir and brake cylinder to the brake pipe in effecting a release of the brakes are each broadly claimed in my pending application, Serial No. 612,465, filed May 20, 1932.

While two illustrative embodiments of the invention have been described in detail, it is not my intention to limit its scope to these embodiments or otherwise than by the terms of the appended claims.

Having now described my invention, what I claim as new and desire to secure by Letters Patent, is:

1. In a fluid pressure brake equipment, the combination with a brake pipe and a brake cylinder, a brake controlling valve device operated by variations in brake pipe pressure for controlling the supply and release of fluid under pressure to and from the brake cylinder, of means for retarding the rate of flow of fluid under pressure to the brake cylinder, a selector valve device operative by fluid under pressure for rendering the retarding means either effective or ineffective to retard the rate of flow of fluid to the brake cylinder, valve means operated according to variations in brake pipe pressure for controlling the pressure of fluid on said selector valve device, and pressure sensitive means operated when the equipment is charged with fluid at a pressure exceeding a predetermined degree for supplying fluid under pressure to said selector valve device to cause the selector valve device to operate to render the retarding means ineffective to retard the rate of flow of fluid to the brake cylinder.

2. In a fluid pressure brake, the combination with a brake pipe, a brake cylinder, a brake controlling valve device operated by variations in brake pipe pressure for controlling the supply and release of fluid under pressure to and from the brake cylinder, and a reservoir charged with fluid under pressure, of means for retarding the rate of flow of fluid under pressure to the brake cylinder, valve mechanism operated according to variations in brake pipe pressure for rendering the retarding means either effective or ineffective to retard the rate of flow of fluid to the brake cylinder, and a valve device subject to the pressure of fluid in said reservoir and operated when the pressure of fluid in said reservoir exceeds a predetermined degree for causing said valve mechanism to operate to render the retarding means ineffective to retard the rate of flow of fluid to the brake cylinder.

3. In a fluid pressure brake, the combination with a brake pipe, a brake cylinder, a brake controlling valve device operated by variations in brake pipe pressure for controlling the supply and release of fluid under pressure to and from the brake cylinder, and a reservoir charged with fluid under pressure, of means for retarding the rate of flow of fluid under pressure to the brake cylinder, valve mechanism operated according to variations in brake pipe pressure for rendering the retarding means either effective or ineffective to retard the rate of flow of fluid to the brake cylinder, and a valve device subject to the pressure of fluid in said reservoir and operated when the pressure of fluid in said reservoir exceeds a predetermined degree for supplying fluid under pressure from said reservoir to said valve mechanism to cause the valve mechanism to operate to render the retarding means ineffective to retard the rate of flow of fluid to the brake cylinder.

4. In a fluid pressure brake, the combination with a brake pipe, a brake cylinder, a brake controlling valve device operated by variations in brake pipe pressure for controlling the supply and release of fluid under pressure to and from the brake cylinder, and an emergency reservoir charged with fluid under pressure, of means for retarding the rate of flow of fluid under pressure to the brake cylinder, valve mechanism operated according to variations in brake pipe pressure for rendering the retarding means either effective or ineffective to retard the rate of flow of fluid to the brake cylinder, and a valve device subject to the pressure of fluid in said emergency reservoir and operated when the pressure of fluid in said emergency reservoir exceeds a predetermined degree for causing said valve mechanism to operate to render the retarding means ineffective to retard the rate of flow of fluid to the brake cylinder.

5. In a fluid pressure brake, the combination with a brake pipe, a brake cylinder, a brake controlling valve device operated by variations in brake pipe pressure for controlling the supply and release of fluid under pressure to and from the brake cylinder, and an auxiliary reservoir charged with fluid under pressure, of means for retarding the rate of flow of fluid under pressure to the brake cylinder, valve mechanism operated according to variations in brake pipe pressure for rendering the retarding means either effective or ineffective to retard the rate of flow of fluid to the brake cylinder, and a valve device subject to the pressure of fluid in said auxiliary reservoir and operated when the pressure of fluid in said auxiliary reservoir exceeds a predetermined degree for causing said valve mechanism to operate to render the retarding means ineffective to retard the rate of flow of fluid to the brake cylinder.

6. In a fluid pressure brake, the combination with a brake pipe, a brake cylinder, a brake controlling valve device operated by variations in brake pipe pressure for controlling the supply and release of fluid under pressure to and from the brake cylinder, and an emergency reservoir charged with fluid under pressure, of means for retarding the rate of flow of fluid under pressure to the brake cylinder, valve mechanism operated according to variations in brake pipe pressure for rendering the retarding means either effective or ineffective to retard the rate of flow of fluid to the brake cylinder, and a valve device subject to the pressure of fluid in said emergency reservoir and operated when the pressure of fluid in said emergency reservoir exceeds a predetermined degree for supplying fluid under pressure from said emergency reservoir to said valve mechanism to cause the valve mechanism to operate to render the retarding means ineffective to retard the rate of flow of fluid to the brake cylinder.

7. In a fluid pressure brake, the combination with a brake pipe, a brake cylinder, a brake controlling valve device operated by variations in brake pipe pressure for controlling the supply and release of fluid under pressure to and from the brake cylinder, and an auxiliary reservoir charged with fluid under pressure, of means for retarding the rate of flow of fluid under pressure to the brake cylinder, valve mechanism operated according to variations in brake pipe pressure for rendering the retarding means either effective or ineffective to retard the rate of flow of fluid to the brake cylinder, and a valve device subject to the pressure of fluid in said auxiliary reservoir and operated when the pressure of fluid in said auxiliary reservoir exceeds a predetermined degree for supplying fluid under pressure from said auxiliary reservoir to said valve mechanism to cause the valve mechanism to operate to render the retarding means ineffective to retard the rate of flow of fluid to the brake cylinder.

8. In a fluid pressure brake equipment, the combination with a brake pipe, of a selector valve device operated by variations in fluid pressure for determining the rate of flow of fluid under pressure in effecting an application of the brakes, means operated by variations in brake pipe pressure for varying the fluid pressure on said selector valve device, and auxiliary means operative at a higher than normal brake pipe pressure for also varying the fluid pressure on said selector valve device.

9. In a fluid pressure brake, the combination with a brake pipe and a brake cylinder, of a chamber normally charged with fluid under pressure, a triple valve device operative upon a reduction in brake pipe pressure for supplying fluid under pressure from said chamber to the brake cylinder, and means having one position for establishing communication through which fluid under pressure is supplied by said triple valve device from said chamber to the brake cylinder and having another position for preventing the flow of fluid from the chamber to the brake cylinder when the triple valve device is operated to fluid pressure supplying position.

10. In a fluid pressure brake, the combination with a brake pipe and a brake cylinder, of a chamber normally charged with fluid under pressure, a triple valve device operative upon a reduction in brake pipe pressure for supplying fluid under pressure from said chamber to the brake cylinder, and means having one position for establishing communication through which fluid under pressure is supplied by said triple valve device from said chamber to the brake cylinder and having another position for preventing the flow of fluid from the chamber to the brake cylinder, said means being positioned according to the rate of increase in brake pipe pressure in releasing the brakes.

11. In a fluid pressure brake, the combination with a brake pipe and a brake cylinder, of a chamber normally charged with fluid under pressure, a triple valve device operative upon a reduction in brake pipe pressure for supplying fluid under pressure from said chamber to the brake cylinder, means having one position for establishing communication through which fluid under pressure is supplied by said triple valve device from said chamber to the brake cylinder and having another position for preventing the flow of fluid from the chamber to the brake cylinder when the triple valve device is moved to fluid pressure supplying position, and a valve preventing back flow of fluid from the brake cylinder to said chamber when said means is in the first mentioned position.

12. In a fluid pressure brake, the combination with a brake pipe and a brake cylinder, of a chamber adapted to be charged with fluid under pressure, a triple valve device operative upon a reduction in brake pipe pressure for effecting an application of the brakes and operative upon an increase in brake pipe pressure for effecting a release of the brakes, said triple valve device comprising a valve which in release position establishes communication through which said chamber is charged with fluid under pressure and which in application position establishes communication through which fluid under pressure is adapted to flow from the chamber to the brake cylinder, and means positioned on cars at the front end of the train for establishing communication through which fluid under pressure is supplied by the triple valve device from said chamber to the brake cylinder and positioned on cars at the rear end of the train for cutting off said communication.

13. In a fluid pressure brake, the combination with a brake pipe and a brake cylinder, of a chamber adapted to be charged with fluid under pressure, a triple valve device operative upon a reduction in brake pipe pressure for effecting an application of the brakes and operative upon an increase in brake pipe pressure for effecting a release of the brakes, said triple valve device comprising a valve which in release position establishes communication through which said chamber is charged with fluid under pressure and which in application position establishes communication through which fluid under pressure is adapted to flow from the chamber to the brake cylinder, and means positioned upon a rapid increase in brake pipe pressure while releasing the brakes for establishing communication through which fluid under pressure is supplied by said triple valve device from said chamber to the brake cylinder.

14. In a fluid pressure brake, the combination with a brake pipe and a brake cylinder, of a chamber adapted to be charged with fluid under pressure, a triple valve device operative upon a reduction in brake pipe pressure for effecting an application of the brakes and operative upon an increase in brake pipe pressure for effecting a release of the brakes, said triple valve device comprising a valve which in release position establishes communication through which said chamber is charged with fluid under pressure and which in application position establishes communication through which fluid under pressure is adapted to flow from the chamber to the brake cylinder, means positioned upon a rapid increase in brake pipe pressure in releasing the brakes for establishing communication through which fluid under pressure is supplied by the triple valve device from said chamber to the brake cylinder, and a check valve preventing back flow of fluid from the brake cylinder to said chamber.

15. In a fluid pressure brake, the combination with a brake pipe and a brake cylinder, of a brake controlling valve device comprising a casing having a passage through which fluid under pressure released from the brake cylinder is adapted to flow to the atmosphere at a predetermined rate and having another passage connected to the first mentioned passage through which fluid under pressure released from the brake cylinder flows at a relatively slower rate, and a valve included in said brake controlling valve device having a full release position and a retarded release position, said valve in full release position connecting the brake cylinder to both of said passages at the seat of the valve and in retarded release position closing off communication from the brake cylinder to the first mentioned passage at the seat of the valve and for maintaining open the communication from the brake cylinder to the second mentioned passage to retard the rate of flow of fluid from the brake cylinder.

16. In a fluid pressure brake, the combination with a brake pipe and a brake cylinder, of a brake controlling valve device comprising a casing having a passage through which fluid under pressure released from the brake cylinder is adapted to flow to the atmosphere at a predetermined rate and having another passage connected to the first mentioned passage through which fluid under pressure released from the brake cylinder is adapted to flow to the first mentioned passage, means removably mounted in the casing adapted to retard the rate of flow of fluid from the brake cylinder, said casing having an opening formed therein for rendering the retarding means accessible from the exterior of the casing for repair and cleaning, a removable plug closing said opening, and means included in said brake controlling valve device operative upon a rapid increase in brake pipe pressure for rendering the retarding means effective to retard the rate of flow of fluid from the brake cylinder and operative upon a relatively slower increase in brake pipe pressure for rendering the retarding means ineffective to retard the rate of flow of fluid from the brake cylinder.

CLYDE C. FARMER.